United States Patent [19]

Laimighofer et al.

[11] Patent Number: 4,919,473
[45] Date of Patent: Apr. 24, 1990

[54] STRUCTURAL SHAPE (BEAM) ESPECIALLY FOR RAMMING PROTECTION IN SIDE DOORS AND WALLS OF MOTOR-VEHICLE BODIES

[75] Inventors: Johann Laimighofer, Braunau; Peter Garnweidner, Salzburg; Peter Üblacker, Dürmoss; Johann Luttinger, Schalchen, all of Austria

[73] Assignee: Austria Metall Aktiengesellschaft, Braunau am Inn, Austria

[21] Appl. No.: 119,138

[22] Filed: Nov. 10, 1987

[30] Foreign Application Priority Data

Nov. 10, 1986 [AT] Austria .................................. 2983/86

[51] Int. Cl.$^5$ ............................................. B60R 27/00
[52] U.S. Cl. .................................... 296/188; 296/146; 296/189; 188/371; 188/377; 49/502
[58] Field of Search ....................... 296/146, 188, 189; 188/371, 377; 49/501, 502, 503; 52/731, 732, DIG. 5, 729, 232

[56] References Cited

U.S. PATENT DOCUMENTS

| 3,829,149 | 8/1974 | Stevens | 296/189 |
|---|---|---|---|
| 4,128,978 | 12/1978 | Beynon | 52/232 |
| 4,290,641 | 9/1981 | Miyauchi et al. | 296/146 |
| 4,411,466 | 10/1983 | Koike | 296/188 |
| 4,599,843 | 7/1986 | Ingvarsson | 52/729 |
| 4,684,151 | 8/1987 | Drewek | 296/189 X |
| 4,684,166 | 8/1987 | Kanodia | 296/188 X |
| 4,702,515 | 10/1987 | Kato et al. | 296/189 |
| 4,708,390 | 11/1987 | Palentyn et al. | 52/731 X |

FOREIGN PATENT DOCUMENTS

| 375307 | 7/1984 | Austria . | |
|---|---|---|---|
| 0164411 | 9/1933 | Fed. Rep. of Germany | 49/301 |
| 1480089 | 8/1969 | Fed. Rep. of Germany | 49/502 |
| 2021906 | 11/1971 | Fed. Rep. of Germany . | |
| 2328829 | 1/1975 | Fed. Rep. of Germany . | |
| 1959988 | 4/1975 | Fed. Rep. of Germany . | |
| 2426705 | 12/1975 | Fed. Rep. of Germany | 296/146 |
| 2457400 | 6/1976 | Fed. Rep. of Germany . | |
| 3151861 | 7/1983 | Fed. Rep. of Germany . | |
| 3606024 | 8/1987 | Fed. Rep. of Germany | 296/146 |
| 2425338 | 1/1980 | France | 296/146 |
| 2072588 | 10/1981 | United Kingdom | 296/188 |

Primary Examiner—Dennis H. Pedder
Assistant Examiner—Andrew C. Pike
Attorney, Agent, or Firm—Herbert Dubno

[57] ABSTRACT

A beam or girder in a side wall or door of a passenger motor vehicle and adapted to provide resistance to lateral collision has a compression flange thereof provided with openings in the form of bores and/or notches so that brittle fracture of the beam can be avoided when the elastic limit is exceeded.

17 Claims, 1 Drawing Sheet

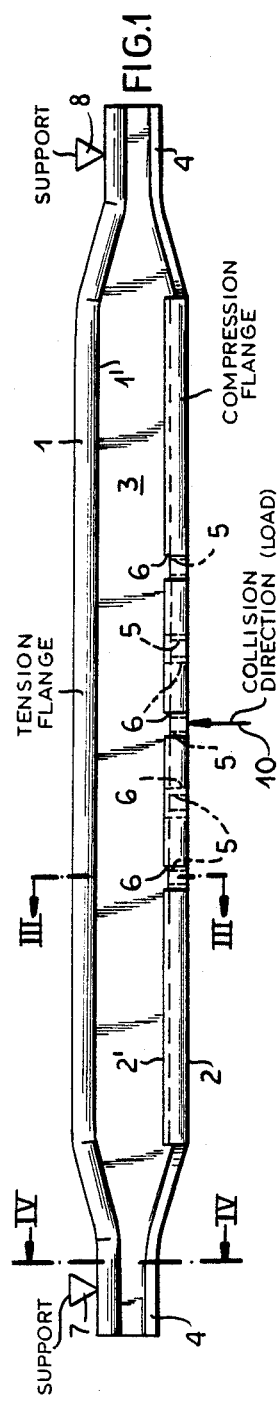
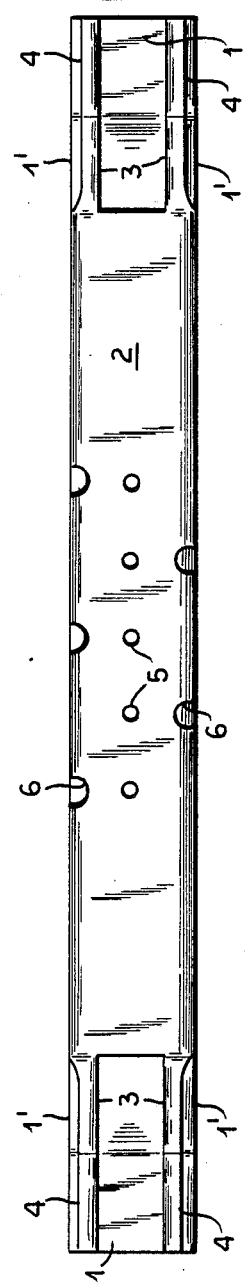
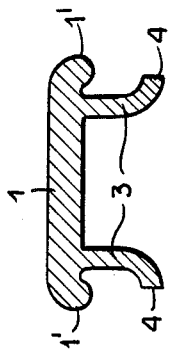
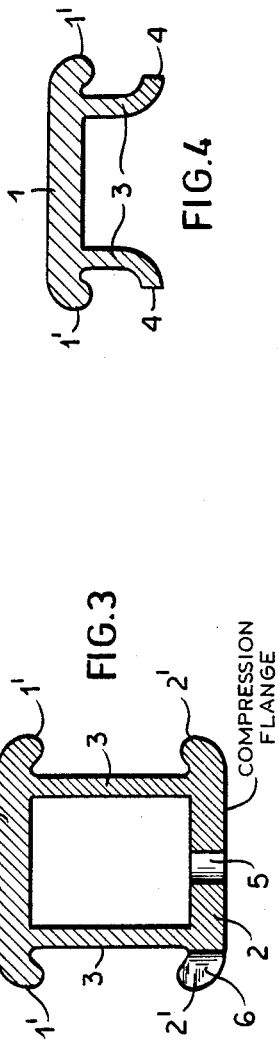

STRUCTURAL SHAPE (BEAM) ESPECIALLY FOR RAMMING PROTECTION IN SIDE DOORS AND WALLS OF MOTOR-VEHICLE BODIES

FIELD OF THE INVENTION

The present invention relates to a structural shape, i.e. a beam, girder or bar, which is capable of taking up impact stresses for uses in motor-vehicle bodies and especially the side doors and walls thereof so that the effect of a collision will be minimized.

BACKGROUND OF THE INVENTION

It is known to provide the side doors of automotive vehicles for the transport of people with stiffening structures such as beams or girders which are capable of resisting a collision from the side and thus lateral collapse of the door or the vehicle.

Such structural shapes have included tubes, I-beams and like stiffening members and have the purpose of so stiffening the thin sheet metal side walls, especially at a level of the greatest possibility of impact, i.e. bumper height, that the door will not be pressed into the vehicle to the point that the passengers seated therein can suffer injury.

To minimize the weight of the vehicle, such girders have been fabricated from light metal, e.g. magnesium, aluminum, aluminum-magnesium alloys.

OBJECT OF THE INVENTION

It is the principal object of the present invention to provide an improved structural shape adapted to be used as a girder for reinforcing the side walls and side doors of a passenger motor vehicle and which has light weight and high strength and which, in general, represents an advance over earlier structural shapes or girders for this purpose.

SUMMARY OF THE INVENTION

These objects and others which will become apparent hereinafter are attained in accordance with the present invention by a partial removal of the pressure flange of a girder or structural shape to be used for reinforcing the side walls or side door of a motor vehicle. It has been found that the removal of the pressure flange, especially a partial removal of the pressure flange at locations along the girder and, in addition, the formation of openings in an intermediate region thereof by forming cutouts therein, can avoid brittle fracture when the elastic limit of the girder is exceeded.

According to a feature of the invention, a number of openings or windows are made in the girder along the pressure flange thereof in spaced-apart locations. In this manner, it is possible to transform the bending parabola of the girder, treated as supported at two points with a centrally applied load, into a nonparabolic curve.

BRIEF DESCRIPTION OF THE DRAWING

The above and other objects, features and advantages of the present invention will become more readily apparent from the following description, reference being made to the accompanying drawings in which:

FIG. 1 is a plan view of the girder diagrammatically illustrating the two-point support and the central loading;

FIG. 2 is a side elevational view of this girder as taken from the outer side of the vehicle;

FIG. 3 is a section taken along the line III—III of FIG. 1; and

FIG. 4 is a section taken along the line IV—IV thereof.

SPECIFIC DESCRIPTION

As can be seen from the drawing, a girder of the invention is basically a square or rectangular section tube which has laterally projecting flanges 1', 2', extending a tension flange 1 and a pressure flange 2 of the girder. The pressure and tension flanges are of greater thickness by comparison with the webs 3 bridging these flanges.

The terms "pressure flange" or "compression flange" and "tension flange" are used in the sense which is customary for beam stressing and analyses of the characteristics of a beam. When the beam is supported at two points, e.g. the points 7 and 8, and a load is applied centrally at 10, e.g. in the form of a collision force, the compression flange, of course, lies on the load-application side and the tension flange on the opposite side because the deformation of the beam tends to follow the load parabola which bows convexly toward the tension flange.

The loading of the beam by a collision, therefore, places the tension flange under tension and the compression flange under compression. In a vehicle door or side wall, the compression flange 2 will lie toward the outside of the vehicle while the tension flange lies toward the inside of the vehicle.

In practice, the beam is supported at the point 7 and 8 on a door frame or a chassis and roof structure of a vehicle.

The attachment at the supports 7 and 8 can be by bolting or welding.

To relieve the stress in the webs 3 and achieve a desired level of buckling resistance, the pressure flange 2 along the center thereof is provided with spaced apart bores 5 over a central region of the girder, i.e. midway between the ends thereof.

In addition, in this region, the overhangs 2' are cut away or notched at 6 by milling, the notches 6 alternating from side to side along the beam. Each notch, however, is provided in a transverse plane through the beam passing through the center of one of the bores 5.

For the sake of this description, the beam will be considered to have a horizontal orientation so that the notches of the overhangs 2' of the compression flange 2 alternate between the upper and lower overhang.

The milled notches 6 ensure that there will be a reduced danger of brittle fracture as a result of exceeding the elastic limit of the girder. In practice, the bending parabola of the girder, braced at two supports with a central applied load, is thereby replaced by a nonparabolic curve.

In the region of support, i.e. in the regions 7 and 8, the compression flange 2 is cut away and the edges of the web 3 which are thereby formed are bent outwardly by a coining operation. The ends have a reduced cross section by comparison with a central portion of the compression flange. This increases the stiffness of the webs in this region. Preferably the edges 4 of the webs 3 are turned outwardly (FIG. 4). The edges are bent from the plane of the web.

The invention should not be considered as being limited to a square or rectangular section beam and the advantages regarding the formation of openings in the compression flange will apply as well to an I-beam.

It is claimed:

1. A collision-resistant reinforcement for a side wall or side door of a motor vehicle comprising a beam composed of a rectangular cross section one-piece tube having a pair of parallel spaced-apart webs and a respective pair of flanges bridged by said webs, each of said flanges projecting laterally beyond said webs along opposite sides of said beam, said beam being supported so as to constitute one of said flanges as a compression flange on a side of potential impact and the other of said flanges as a tension flange, said compression flange being provided with openings over a central portion thereof and having said compression flange cut away at opposite ends of said beam, so that said compression flange remains generally intact between said ends, said compression flange being formed with overhangs projecting laterally beyond said webs, said overhangs being formed with respective pair of spaced apart edges and said overhangs being formed with at least some of said openings.

2. The collision-resistant reinforcement defined in claim 1 wherein said openings include bores spaced apart along said central portion.

3. The collision-resistant reinforcement defined in claim 2 wherein said bores are located along a center line of said compression flange.

4. The collision-resistant reinforcement defined in claim 3 wherein said openings include notches formed along edges of said compression flange at said central portion.

5. The collision-resistant reinforcement defined in claim 4 wherein said notches alternate from edge to edge of said compression flange along the length of said central portion.

6. The collision-resistant reinforcement defined in claim 1 wherein said openings include notches formed along edges of said compression flange at said central portion.

7. The collision-resistant reinforcement defined in claim 6 wherein said notches alternate from edge to edge of said compression flange along the length of said central portion.

8. The collision-resistant reinforcement defined in claim 1 wherein said edges are bent from the plane of each web.

9. The collision-resistant reinforcement defined in claim 8 wherein respective edges of the webs are bent outwardly.

10. The collision-resistant reinforcement defined in claim 1 wherein said beam is composed of a light metal.

11. The collision-resistant reinforcement defined in claim 1 wherein said ends are of reduced cross section by comparison with said central portion.

12. A motor vehicle collision-resistant reinforcement, for a side wall or a side door of a motor vehicle, comprising:
an elongated beam having opposite ends, said beam being formed with:
a tension flange lying toward an inside of the vehicle;
a compression flange spaced from and parallel to said tension flange and lying toward an outside of the vehicle, said compression flange having a center being provided with a plurality of spaced apart openings over a portion of the compression flange spaced from opposite edges thereof, said compression flange being cut away at said opposite ends of the beam; and
a pair of mutually parallel webs bridging said compression and tension flanges, said compression flange being formed with a respective pair of overhangs on said opposite edges extending laterally beyond said webs along said opposite edges of the compression flange and each of said overhangs being provided with respective plurality of spaced apart notches.

13. The collision-resistant reinforcement defined in claim 12 wherein said openings are bores spaced apart along said center of the compression flange and terminate at a distance from said opposite ends of the beam, each of said bores having a respective center.

14. The collision-resistant reinforcement defined in claim 13 wherein each of said notches is provided in a transverse plane passing through the respective center of a respective bore of said compression flange.

15. The collision-resistant door reinforcement defined in claim 12 wherein said notches alternate from edge to edge of said compression flange.

16. The collision-resistant reinforcement defined in claim 12 wherein said beam has a generally rectangular cross section.

17. The collision-resistant reinforcement defined in claim 12 wherein said ends of said beam are of a reduced cross section by comparison with a portion between the ends.

* * * * *